July 6, 1954  L. W. POTE  2,682,701
METHOD OF MAKING VALVE BODIES
Filed Feb. 24, 1950
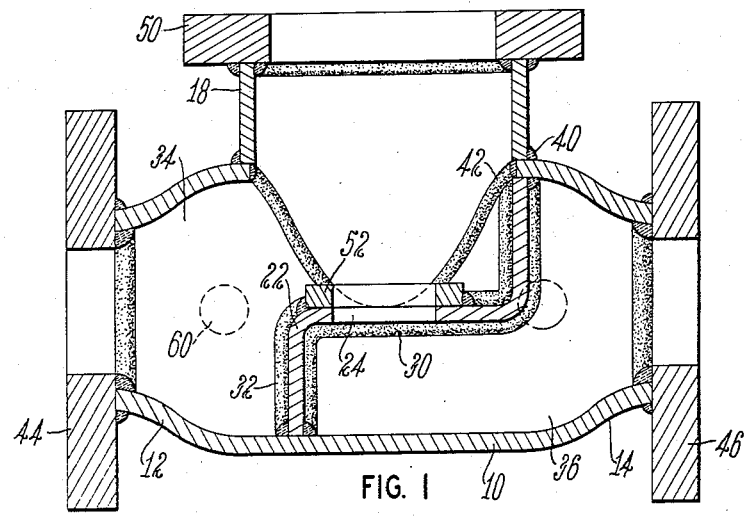
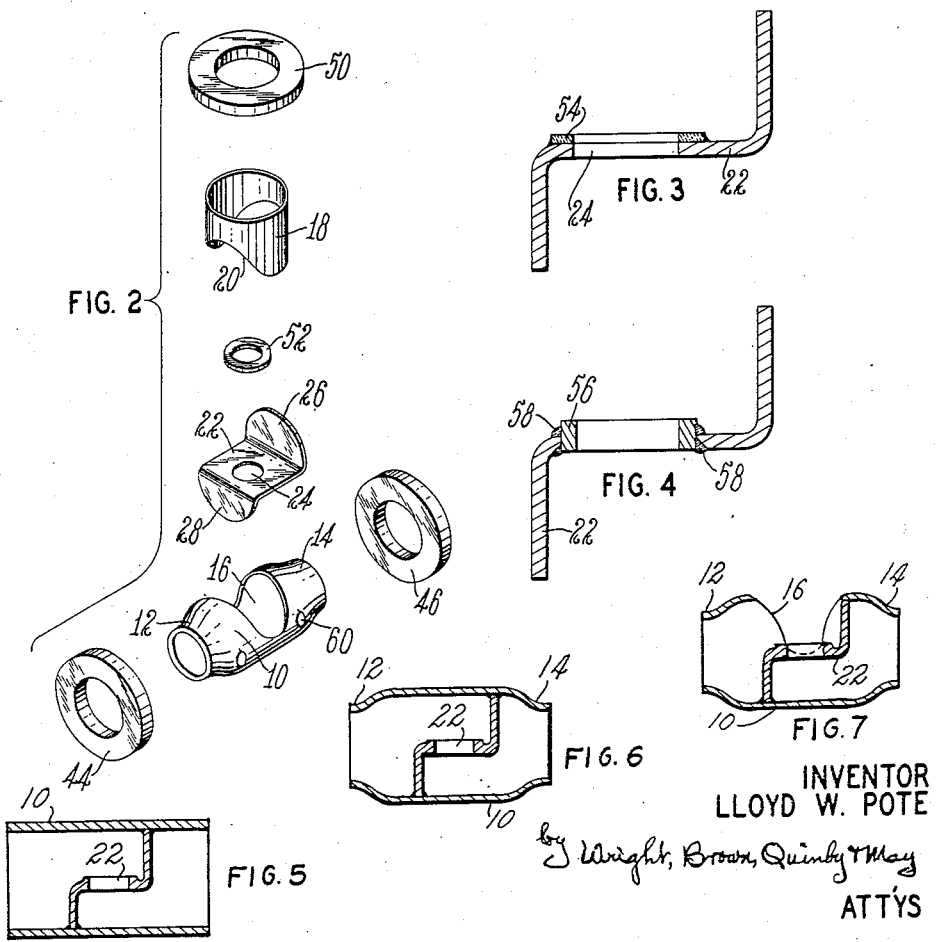
INVENTOR
LLOYD W. POTE
by Wright, Brown, Quinby & May
ATT'YS Patented July 6, 1954

2,682,701

UNITED STATES PATENT OFFICE 2,682,701

METHOD OF MAKING VALVE BODIES

Lloyd W. Pote, Melrose, Mass., assignor to CPC Engineering Corporation, Wakefield, Mass., a corporation of Massachusetts Application February 24, 1950, Serial No. 146,023

2 Claims. (Cl. 29—157.1)

This invention relates to a method of making valve bodies for use in valves of substantial size which may be subjected to high pressures when in use or may be employed in a vacuum system or other service where extreme tightness is necessary. It is an object of the invention to construct a valve body by welding together a number of fabricated parts which are made of metal stock of kinds which are free from the tiny blowholes liable to occur in metal castings. Valve bodies fabricated according to the invention are lighter and stronger than comparable castings and are economical. Aside from the two end members which serve as flanges for the attachment of pipes and the top member on which the valve bonnet is to be mounted, the body consists essentially of three members made of tube or strip stock and welded together, an optional fourth member being a ring for use as the valve seat if a special seat is desired.

A valve body embodying the invention is hereinafter described in detail and is illustrated on the drawing, of which—

Figure 1 is a longitudinal sectional view of a valve body made according to the invention;

Figure 2 is an exploded view of the valve body shown in Figure 1;

Figure 3 is a sectional view of the partition member of the valve body with a modified form of valve seat;

Figure 4 is a sectional view of the partition member with another modified form of valve seat; and Figures 5, 6, and 7 are sectional views showing steps of a modified method of making the valve body according to the invention.

In making a valve body as illustrated on the drawing, a suitable length of tubing is taken and the ends thereof are strongly heated as it is rotated on its axis. When the end portions have become sufficiently heated, they are spun by suitable shaping tools so as to contract the diameter at the ends of the piece of tubing. A hole is made in the side of this member to receive the end of a piece of tube of similar or lesser stock diameter. The result of these operations is the principal member 10 having reduced end portions 12 and 14 and the lateral hole 16 to receive a short piece of tube 18. When the stock diameters of the members 10 and 18 are the same, the hole 16 extends halfway around the circumference of the member 10. An end of the member 18 is suitably shaped as indicated at 20 in Figure 2 so as to fit the edges of the hole 16, the members 10 and 18 making a T joint. Before the member 18 is secured to the member 10, a partition member 22 is introduced into the chamber within the member 10 and is secured in place therein by welding or otherwise. The member 22 may conveniently be made of strip stock or sheet stock from which the blank is cut or punched by a saw, die, blowtorch or other equivalent means, this blank having parallel sides and semicircular ends and being provided with a central hole 24. The end portions 26 and 28 are bent respectively up and down from the plane of the central section of the member which contains a hole 24. The dimensions of the member 22 are such that it will fit within the chamber in the member 10, the entire periphery of the member 22 being actually or nearly in contact with the inside surface of the member 10. The width of the member 22 must therefore be substantially equal to the interior diameter of the member 10, but if the hole 16 is of the same width, it can admit the member 22. The member 22 is arranged so that the holes 16 and 24 are in axial alignment and is then permanently secured in place by lines of welding 30 and 32 which extend along its entire periphery and separate the chamber within the member 10 into two separate compartments 34 and 36. The member 18 may then be secured in place by outer and inner lines of welding 40 and 42 extending along the entire seam between the members 10 and 18. Suitable annular discs 44 and 46 may be welded to the reduced ends of the member 10 to serve as flanges to which flanged pipe can be bolted when the finished valve is installed for use. These discs are omitted when the valve body is intended to be welded directly to the connecting pipes. An annular disc 50 is welded to the end of the member 18 to serve as a base on which the valve bonnet (not shown) may be mounted.

The mid portion of the member 22 surrounding the hole 24 may serve as the valve seat. If preferred, a valve seat member 52 may be welded or otherwise secured on the partition member to register with the hole 24. Thus for the seat member 52 any desired metal or other substance can be employed, and the seat member can be mounted on the partition member before the latter is inserted in the casing 10.

If preferred, a ring 54 of weld metal may be deposited around the edge of the hole 24 to form a valve seat as indicated in Figure 3. Another method of providing a valve seat member is indicated in Figure 4 which shows a seat member 56 in the form of a short tube projecting through the hole 24 and welded to the member 22 at the sides of the hole 24, as at 58. If a special seat member 52, 54, or 56 is provided on the partition member 22, it is preferably mounted in place before the partition member is inserted in the casing 10.

If desired, suitable bosses 60 may be formed on the outside of the member 20 by depositing weld metal thereon or by other means as desired.

The steps of making and assembling the various parts need not follow the order hereinbefore described. For example, the partition member 22 may be made and mounted in the casing member 10, as shown in Figure 5, before the end portions 12 and 14 are spun to reduce diameters, as shown in Figure 6, and before or after the hole 16 is made in the side thereof. Figure 7 shows the valve bodies after the hole 16 has been cut in it.

The valve body herein described is suitable for a globe valve, but it is to be understood that the methods employed can be used to make bodies for valves of other types such as gate valves, check valves, or reducing valves.

I claim:

1. A method of making a valve body which comprises heating the end portions of a first section of metal tube, spinning said end portions while hot to reduce the extremities thereof to a smaller diameter, making a lateral opening in said tube to receive an end of a second section of tube of the same stock diameter, said lateral opening being formed substantially as a projection of a circle on the side of said length of tube, forming from strip metal stock an elongated partition member having a central portion with parallel side edges spaced apart slightly less than the full interior diameter of said first tube, and semicircular end portions of substantially the same diameter, said end portions being directed oppositely from said central portion at substantial right angles thereto, inserting said partition member as a single unit through said lateral opening into the first tube to place said elongated central section substantially at the axis of said first tube, integrally joining said partition member along its entire periphery to the interior of said first tube, trimming said second tube at one end thereof to fit said lateral opening in said first tube and integrally joining said second tube to said first tube to make a T-joint therewith, and integrally joining flange disks to the ends of said tubes.

2. The method in accordance with claim 1 in which the valve seat is formed by integrally joining a ring to said central elongated partition member.

References Cited in the file of this patent

UNITED STATES PATENTS

| Number | Name | Date |
|---|---|---|
| 58,503 | Stierle et al. | Oct. 2, 1866 |
| 2,030,818 | Harter | Feb. 11, 1936 |
| 2,122,957 | Santamaria | July 5, 1938 |
| 2,173,759 | McCloskey | Sept. 19, 1939 |
| 2,206,296 | Clark | July 2, 1940 |
| 2,301,176 | Elliott | Nov. 10, 1942 |
| 2,363,943 | Carlson | Nov. 28, 1944 |
| 2,418,447 | Arbogast | Apr. 8, 1947 |

FOREIGN PATENTS

| Number | Country | Date |
|---|---|---|
| 489,602 | Great Britain | July 29, 1938 |
| 104,775 | Sweden | June 16, 1942 |
| 551,874 | Great Britain | Mar. 12, 1943 |
| 62,271 | Netherlands | Dec. 15, 1948 |